United States Patent [19]

Hukki et al.

[11] Patent Number: 5,134,893
[45] Date of Patent: Aug. 4, 1992

[54] ADJUSTABLE COUNTERWEIGHT ASSEMBLY

[75] Inventors: Ari M. Hukki, Edgewood; Bradley N. Jones, Walton, both of Ky.

[73] Assignee: Sweco, Incorporated, Florence, Ky.

[21] Appl. No.: 696,898

[22] Filed: May 7, 1991

[51] Int. Cl.5 .......................... F16H 33/00; G05G 5/06
[52] U.S. Cl. .......................................... 74/61; 74/87; 74/533; 366/128
[58] Field of Search ............................ 74/61, 87, 533; 366/128

[56] References Cited

U.S. PATENT DOCUMENTS

| | | | |
|---|---|---|---|
| 3,097,537 | 7/1963 | Peterson | 74/61 |
| 3,386,296 | 6/1968 | Matson | 74/87 |
| 3,572,641 | 3/1971 | Peterson et al. | 74/61 X |
| 3,625,074 | 12/1971 | Waschulewski et al. | 74/61 |
| 4,940,336 | 7/1990 | Dryga et al. | 74/87 X |

FOREIGN PATENT DOCUMENTS 1202229  1/1960  France .................................. 74/87

Primary Examiner—Allan D. Herrmann
Assistant Examiner—David W. Laub
Attorney, Agent, or Firm—Lyon & Lyon

[57] ABSTRACT

A counterweight assembly on a vertical, rotatably mounted shaft which is adjustable. First and second eccentric weight assemblies are fixed to the shaft. One of the eccentric weight assemblies includes a support fixed to the shaft to extend laterally of the shaft. The support has a ring of slots displaced laterally of the shaft. Two eccentric weights are rotatably mounted about the shaft and have pins extending to the ring of slots.

13 Claims, 2 Drawing Sheets

ADJUSTABLE COUNTERWEIGHT ASSEMBLY

BACKGROUND OF THE INVENTION

The field of the present invention is vibratory mechanisms for vibrating machinery and more specifically eccentric weight systems therefore.

A wide variety of vibratory mechanisms have been developed for screening, milling, mixing and the like. Such devices, particularly with circular chambers, use an electric motor having a driven vertical shaft with a weight assembly at each end. One of the weight assemblies typically has adjustment for the amount of eccentric weight only. The other allows for the adjustment of weight and variation in the lead angle of the weight in relation to the first assembly.

Because of the vibratory environment in which these devices are used, the weights are normally positioned and the lead angle selected using fasteners securely fixed with tools. Often, such attachment does not lend itself to discrete positions of selected lead angles or weight amounts. Further, the locations of these weight systems are most typically positioned inconveniently below and substantially centered under the vibratory mechanism. Consequently, changing and adjusting such systems is inconvenient, requires experience and takes substantial time.

SUMMARY OF THE PRESENT INVENTION

The present invention is directed to an adjustable counterweight assembly for association with a vertical, rotatably mounted shaft. Two eccentric weight assemblies are fixed to the shaft with one of the assemblies including a support having a ring of slots and eccentric weights adjustably mounted about the shaft with pins extending to the ring of slots. The adjustable weights allow an individual to readjust the effective weight, eccentricity and lead angle quickly, easily and without the manipulation of fasteners and the use of tools.

Thus, it is an object of the present invention to provide an improved vibratory weight assembly with easily changeable lead angle, eccentricity and effect weight. Other and further objects and advantages will become apparent from the following description and the drawings.

DETAILED DESCRIPTION OF THE PREFERRED EMBODIMENT

Figure 1:
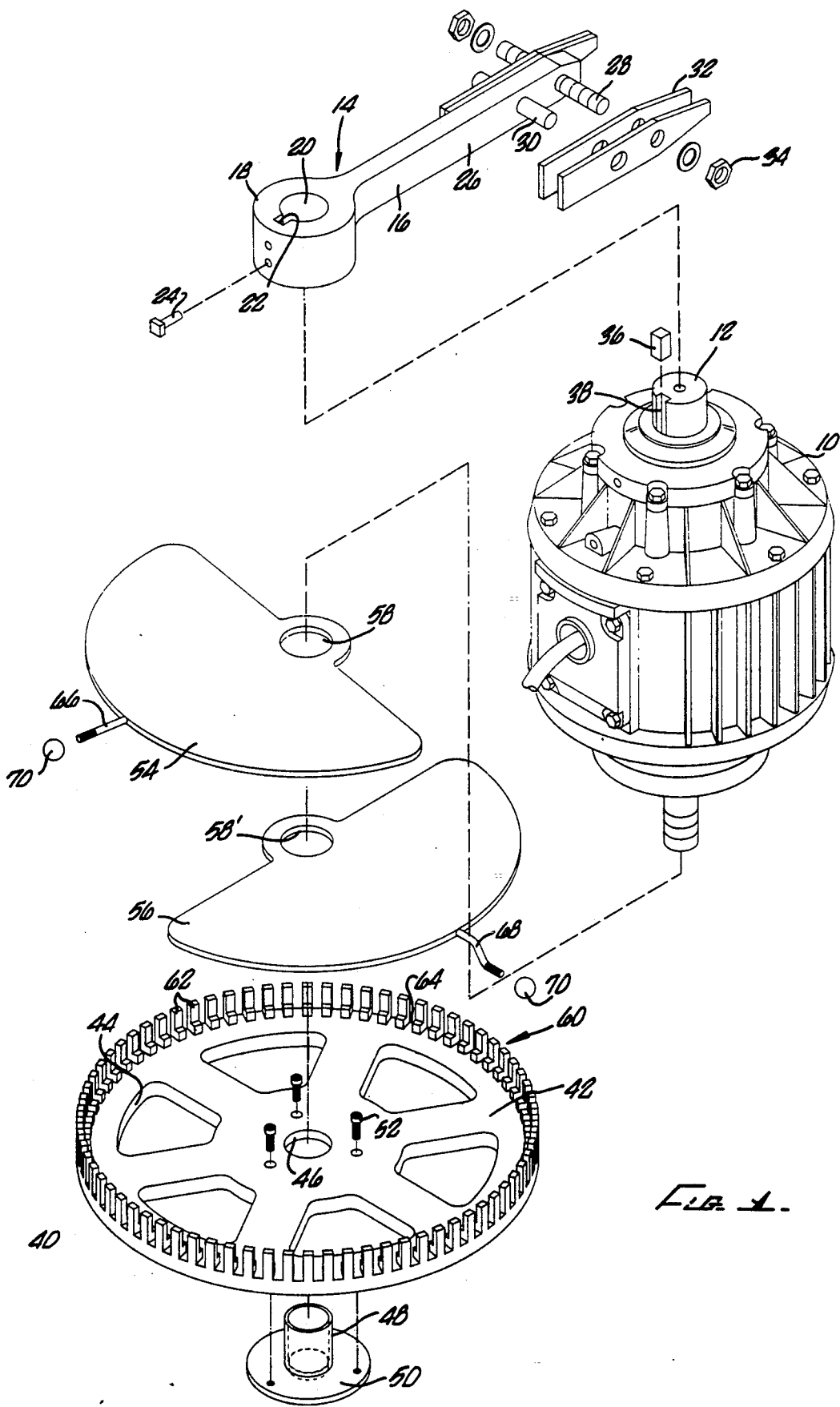
FIG. 1 is an exploded assembly view in perspective of the present invention.

Turning in detail to the drawings, FIG. 1 illustrates an adjustable counterweight assembly illustrated in an exploded assembly view. The adjustable counterweight assembly is mounted to an electric motor 10 which has a vertically oriented rotatably mounted shaft 12 having mechanisms for fastening components to either end. The shaft 12 is driven by the electric motor 10. The electric motor 10 may be mounted directly to a vibratory mechanism such as a vibratory screen separator, a vibratory finishing mill or the like. Such devices typically are advantageously operated using a variety of vibration amplitudes and lead angles.

Fixed to the upper end of the shaft 12 is a first eccentric weight assembly, generally designated 14. This eccentric weight assembly 14 includes an eccentric weight hanger 16 having a central collar 18 for association with the shaft 12. The collar includes a hole 20 with a key way 22 and set screws 24. The hanger 16 has a radially extending arm 26 having laterally extending pins 28 and 30 adjacent the end. Weights 32 may be positioned on the pins 28 and 30 as can best be seen from FIG. 1 and bolted in place by bolts 34. The eccentric weight assembly 14 is fixed to the shaft 12 through the key way 22 by means of a key 36 and a key way 38 located in the shaft 12. This upper eccentric weight assembly 14 is conventional in design.

At the lower end of the shaft 12, a second eccentric weight assembly, generally designated 40, is arranged. This lower eccentric weight assembly 40 includes a support 42. The support 42 extends laterally of the shaft 12, is circular and has lightening holes 44. A central hole 46 accommodates the shaft and an anchoring collar 48. The anchoring collar 48 has a flange 50 for mounting to the hub portion of the support 44 by means of fasteners 52. The collar 48 is affixed by conventional means to the lower end of the shaft 12. The support 42 is presently contemplated to be urethane. The collar 48 may then be molded in place.

Located on the support 42 are first and second weights 54 and 56, each having a mounting hole, 58 and 58', respectively. These weights are of equal eccentricity and are fan shaped plates. Each fan shaped plate is eccentric to its mounting hole 58, either 58 or 58'. Each mounting hole fits over the collar 48 and is slidable thereon both axially of the shaft 12 and angularly about the shaft 12.

The support 42 includes about its outer periphery a ring, generally designated 60, of slots 64. The ring 60 of slots 64 is defined by upstanding stops 62 which define the slots 64 therebetween. These stops 62 may be placed at convenient intervals such that the ring 60 is divided into regular angular spacing. In the preferred embodiment, slots 64 are defined at 5" intervals.

The stops 62 each include a step 65 on the inner side of the ring 60. The upper weight 54 is larger than the lower weight 56 such that the upper weight 54 rides on the steps 65 while the smaller, lower weight rides on the support 42 inwardly of the steps 65. The geometry of the weights allows each to have equal eccentricity in spite of the variation in outer diameter. By providing the steps 65, the upper weight 54 will not be tipped if set so that it does not lay directly over the lower weight 56.

Figure 2:
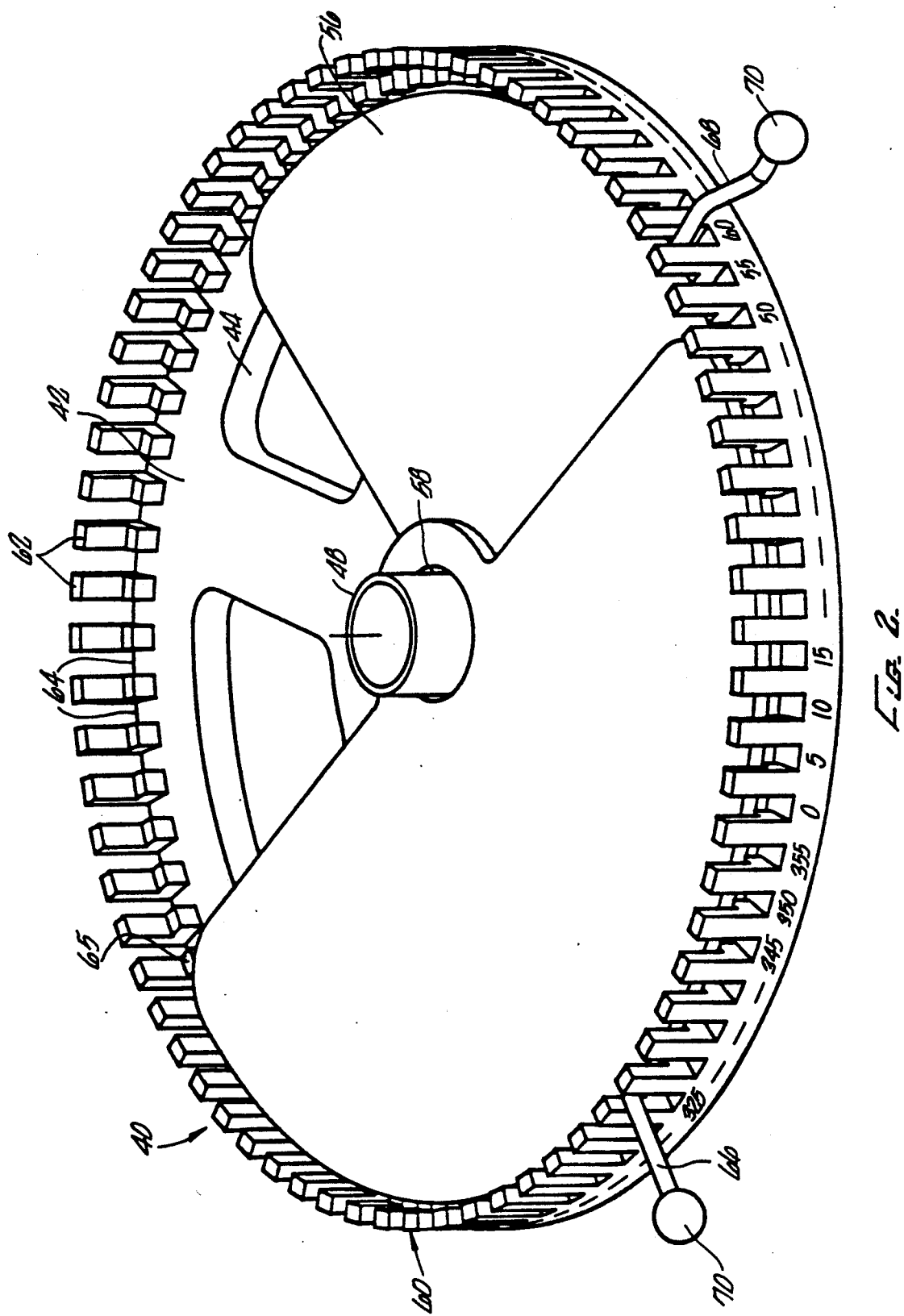
FIG. 2 is a detail perspective view of the second eccentric weight assembly of the present invention.

Located on each of the weights 54 and 56 is a pin. The first pin 66 associated with the weight 54 extends radially outwardly from the periphery of the fan shaped plate. The second pin 68 is similarly positioned on the second weight 56. It extends both radially outwardly and downwardly so as to create a clearance with the first pin 66. Knobs 70 are threaded onto the end of each of the pins 66 and 68 for convenient purchase. The slots 64 and the pins 66 and 68 are so arranged that the pins fit into the slots without substantial play. Looking specifically to FIG. 2, printed indicia about the outer periphery of the support 42 guides an operator in the placement of the weights 54 and 56.

In operation, the appropriate weights 32 are bolted to the upper eccentric weight assembly 14. The lower eccentric weights 54 and 56 are then positioned according to the desired lead angle and eccentricity. Because these weights are located at the lower end of the assembly they are generally easily accessible. If accessibility requires, they may change position with the eccentric weight assembly 14 for convenience. In adjustment of the eccentric weight assembly 40, maximum eccentricity is achieved by lining the weights 54 and 56 up with one another. In this embodiment, pins 66 and 68 would then be aligned as well. To have no eccentricity in the weight assembly 40, the plates would be positioned with the pins 66 and 68 diametrically opposed. Thus, by moving the weights 54 and 56, a range of weight eccentricity can be achieved. The degree of lead angle is also accomplished by moving the weights 54 and 56 in the same direction about the support 42. To adjust the weights, they are simply lifted upwardly by the knobs 70 such that the pins 66 and 68 clear the slot 64. Once positioned, the Weights are lowered and the motor may be energized.

Thus, an easily adjustable counterweight assembly has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An adjustable counterweight assembly on a vertical, rotatably mounted shaft, comprising
   a first eccentric weight assembly fixed to the shaft;
   a second eccentric weight assembly displaced from said first eccentric weight assembly along the shaft, said second eccentric weight assembly including a support fixed to the shaft to extend laterally of the shaft, said support having a ring of slots displaced laterally of the shaft, a first eccentric weight rotatably mounted about the shaft and having a first pin extending to said ring of slots, a second eccentric weight rotatably mounted about the shaft and having a second pin extending to said ring of slots.

2. The adjustable counterweight assembly of claim 1 wherein said first and said second eccentric weights are of equal eccentricity.

3. The adjustable counterweight assembly of claim 2 wherein said first and said second eccentric weights are fan shaped plates.

4. The adjustable counterweight assembly of claim 1 wherein said first and said second eccentric weights are stacked on said support.

5. The adjustable counterweight assembly of claim 1 wherein said first and said second eccentric weights are axially slidable on the shaft.

6. The adjustable counterweight assembly of claim 1 wherein said first eccentric weight assembly includes an eccentrically positioned weight hanger.

7. The adjustable counterweight assembly of claim 1 wherein said ring of slots includes upstanding stops defining said slots therebetween and said first and said second pins each extend radially outwardly of said respective first and second eccentric weights into said ring of slots.

8. The adjustable counterweight of claim 7 wherein said upstanding stops each include a step, said first eccentric weight being positioned above said second eccentric weight and being supported by said steps.

9. The adjustable counterweight assembly of claim 1 wherein said support includes a disc, said ring of slots being disposed about the periphery of said disc.

10. The adjustable counterweight assembly of claim 9 wherein said ring of slots includes upstanding stops defining said slots therebetween, said first and said second pins each extending radially outwardly of said respective first and second eccentric weights into said ring of slots.

11. An adjustable counterweight assembly on a vertical, rotatably mounted shaft, comprising
    a first eccentric weight assembly fixed to the shaft, said first eccentric weight assembly including an eccentrically positioned weight hanger to receive selected weights;
    a second eccentric weight assembly displaced from said first eccentric weight assembly along the shaft, said second weight assembly including a support fixed to the shaft to extend normal to the longitudinal centerline of the shaft, said support having a ring of slots displaced radially outwardly from the shaft, a first eccentric weight rotatably mounted about the shaft and having a first pin extending to said ring of slots, a second eccentric weight rotatably mounted about the shaft and having a second pin extending to said ring of slots, said first and said second eccentric weights being of equal eccentricity.

12. An adjustable counterweight assembly on a vertical, rotatably mounted shaft, comprising
    a first eccentric weight assembly fixed to the shaft;
    a second eccentric weight assembly displaced from said first eccentric weight assembly along the shaft, said second eccentric weight assembly including a support fixed to the shaft to extend normal to the longitudinal centerline of the shaft, said support having a ring of slots displaced radially outwardly from the shaft, a first eccentric weight rotatably mounted about the shaft and having a first pin extending to said ring of slots, a second eccentric weight rotatably mounted about the shaft and having a second pin extending to said ring of slots, said first and said second eccentric weights being fan shaped plates of equal eccentricity stacked on said support and axially slidable on the shaft.

13. An adjustable counterweight assembly on a vertical, rotatably mounted shaft, comprising
    a first eccentric weight assembly fixed to the shaft;
    a second eccentric weight assembly displaced from said first eccentric weight assembly along the shaft, said second eccentric weight assembly including a support fixed to the shaft to extend normal to the longitudinal centerline of the shaft, said support having a ring of slots displaced radially outwardly from the shaft and including upstanding stops defining said slots therebetween, a first eccentric weight rotatably mounted about and axially slidable on the shaft and having a first pin extending to said ring of slots, a second eccentric weight rotatably mounted about and axially slidable on the shaft and having a second pin extending to said ring of slots, said first and said second pins each extending radially outwardly of said respective first and second eccentric weights into said ring of slots.

* * * * *